(12) United States Patent
Ferreira Lino et al.

(10) Patent No.: US 8,051,524 B2
(45) Date of Patent: Nov. 8, 2011

(54) MULTI-DIAMETER ELASTIC SEALING MODULE FOR PIGS

(75) Inventors: Antonio Carlos Ferreira Lino, Rio de Janeiro (BR); Carlos Alberto Dias da Silva, Rio de Janeiro (BR); Ricardo Wagner Capllonch, Teresopolis (BR)

(73) Assignee: Petroleo Brasileiro S.A.-Petrobras, Rio de Janeiro (BR)

( * ) Notice: Subject to any disclaimer, the term of this patent is extended or adjusted under 35 U.S.C. 154(b) by 279 days.

(21) Appl. No.: 12/471,028

(22) Filed: May 22, 2009

(65) Prior Publication Data

US 2009/0320223 A1 Dec. 31, 2009

(51) Int. Cl.
*F16L 55/26* (2006.01)
*B08B 9/055* (2006.01)

(52) U.S. Cl. .............. 15/104.061; 15/104.19; 138/89

(58) Field of Classification Search ............ 15/3.5, 15/104.05, 104.061, 104.16, 104.17, 104.18, 15/104.19; 138/89
See application file for complete search history.

(56) References Cited

U.S. PATENT DOCUMENTS

| | | | |
|---|---|---|---|
| 232,118 A * | 9/1880 | Felthousen | 15/104.066 |
| 450,323 A * | 4/1891 | Tomlinson et al. | 15/104.19 |
| 849,786 A * | 4/1907 | Hildenbrand | 15/104.19 |
| 886,362 A * | 5/1908 | Fletcher | 15/104.19 |
| 904,122 A * | 11/1908 | Fletcher | 15/104.19 |
| 987,145 A * | 3/1911 | Leisinger | 138/89 |
| 2,653,334 A * | 9/1953 | Bay | 15/104.14 |
| 3,602,934 A | 9/1971 | Reed | |
| 4,016,620 A | 4/1977 | Powers | |
| 4,242,771 A | 1/1981 | Knapp | |
| 4,720,884 A | 1/1988 | Ralls | |
| 5,384,929 A | 1/1995 | Smith | |
| 5,895,619 A | 4/1999 | Knapp | |
| 5,966,768 A * | 10/1999 | Hahn | 15/104.061 |
| 6,145,150 A | 11/2000 | Knapp | |
| 6,500,271 B1 | 12/2002 | Moore et al. | |
| 6,538,431 B2 | 3/2003 | Couchman et al. | |

FOREIGN PATENT DOCUMENTS

BR 0304793-8 A 6/2005

\* cited by examiner

*Primary Examiner* — Mark Spisich
(74) *Attorney, Agent, or Firm* — Sughrue Mion, PLLC

(57) ABSTRACT

A multi-diameter elastic sealing module for pigs, which operates in pipes having diameter changes, by being sent through the inside of a flexible or rigid pipe to move or draw various fittings and remove internal incrustations from the pipe, impelled by a fluid which flows inside said pipe.

The sealing module comprises a sealing/impelling element (1), a flexible core (2) covered by the sealing/impelling element (1), a first clamping element (3), a second clamping element (4), a first fastening element (5) and a second fastening element (6).

15 Claims, 7 Drawing Sheets

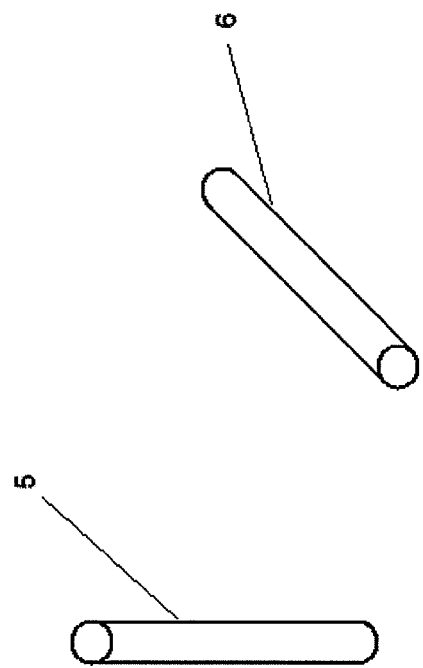

MULTI-DIAMETER ELASTIC SEALING MODULE FOR PIGS

FIELD OF THE INVENTION

The field of operation of this invention is equipment intended for being sent through the inside of a pipe of variable diameter impelled by a fluid which flows in the pipe.

BASES OF THE INVENTION

Many major industries use pipes to transport various types of fluids.

The use of equipment capable of moving through the inside of a pipe by means of, for example, the flow of fluid is well known in the art and the equipment is frequently referred to by the English term "pipeline pig", hereinafter simply called by the term PIG.

Pigs are items of equipment which, when inserted in the pipeline travel along its length, pushed generally by the flow of the fluid within the pipe. They are classified in two categories: "Utility pigs", which perform the function of cleaning, separation of products and removal of water and "In-line inspection tools", also known as "instrument pigs", "intelligent pigs" or "smart pigs", which supply information on the condition of the line, as well as on the extent and location of any problems.

Pigs are used both during the construction of a pipeline and during the operational life of the pipelines.

Frequently, deposits form on internal walls, which can generate operation problems or even some degree of risk depending on the characteristics of the fluid present and the flow conditions inside the pipe. In some cases, the rate of formation of deposits on the pipe's internal wall is very slow and the deposits are not very hard and do not adhere strongly. In these cases, these types of deposit can be removed very easily, even after they first occur. In other cases, the formation can prove to be serious incrustations, possibly even causing total obstruction of the flow of fluid. In both of the cases referred to above, a pig is used to scrape the material deposited inside the pipe, promoting the cleaning thereof.

The pigs referred to above have been used for a long time and are more efficient when the pipe diameter is constant.

However, conventional pigs can have a number of drawbacks. For example the pig's metal body can break inside the pipe, at pipe joints or even in valves.

Another possible example of a draw back of the conventional pigs involves the pig's capability to go through pipe bends having a very short radius. Depending on the radius used, these bends in the pipe may lead to jamming of the pig, which causes huge problems.

However, pigs constructed with non-rigid elements do not have the same drawbacks mentioned above. In the event of a structural defect in the pig, if the construction material is normally elastomeric, a second pig can always be sent to move pieces of elastomer which may have come away inside the pipe and which the flow of fluid has not been able to move. However, fluid transport lines have been used recently, in which the pipes forming the transport line are of various different nominal diameters. In these cases, the conventional types of pig have become unsuitable.

A pig may have a diameter which is suitable for a particular inside diameter of a length of pipe but which may give rise to the jamming of the same pig in another length of smaller inside diameter of the pipe or the pig may lose thrust when the inside diameter of the pipe increases and the fluid passes in the annular space between the cup and pipe.

A typical example of one of the situations mentioned above would be an elastomeric pig with cleaning cups which do not have very great flexibility. While the pipe diameter is reduced to a value at which the flexibility of the scraping cups can deform, there will be no problems. However, if the diameter is very small, and the flexibility of the scraping cups is such that there cannot be sufficient deformation of the cups, this may cause jamming of the pig.

Therefore a need has been felt for the development of pigs which were capable of carrying out cleaning in pipes of heterogeneous diameter. Certain developments have started to emerge.

However, most of the innovations focus on cups adapted to the pig, both in terms of physical characteristics of the material with which they were made and in terms of new configurations capable of withstanding the changes in diameter. These pigs are known as "multi-size pigs".

A disadvantageous and very common problem in pigs with multi-size seals is the "nose down" misalignment of the latter pigs with respect to the pipe centre-line, due to excessive flexibility of the seals.

Another type of pig existing is the known "foam pig", which is so called due to being made from a foamed polymeric material such as polyurethane foam, for example.

In comparison with the types of pig described above, a pig made of foam has reasonable mechanical strength and good deformation capability.

Conventional "foam pigs" have a body shape with a concave recess in one of their ends to act as an area concentrating the pressure exerted by the impelling fluid and having a certain convexity at the other end.

One feature of this type of pigs is great deformation capability which they can have. However, this great deformation involves low efficiency of removal of hard deposits when in a length of larger-diameter pipe or can cause tears in the body of the pig when in a length of smaller diameter due to a lower strength of the material from which it is made. These tears can result in the possible destruction of the pig.

Considering the low cost of material from which the pig is made, these deformation problems may be acceptable in the case of deposits which are soft and easily removed.

The search for more efficient cleaning of the insides of pipes by using "foam pigs" has progressed.

In an attempt to increase abrasion in the pig/pipe internal wall contact, proposals have emerged which include modification of the surface texture of the pig body. From among these modifications, reference can be made to the creation of external radial grafts on to the pig body, with bristles or rough surfaces in various configurations such as diamond shapes, as shown in document U.S. Pat. No. 3,602,934 to the Acushnet Company and U.S. Pat. No. 4,242,771 to Kenneth M. Knapp. Another modification involves the superimposition of different materials and in other formats as shown in document U.S. Pat. No. 5,895,619 to Kenneth M. Knapp or covering of the whole of the pig body with an outer layer provided with miniscule metal or non-metal bristles, as illustrated by document U.S. Pat. No. 4,016,620 to Pipeline Dehydrators Inc.

Document U.S. Pat. No. 6,500,271 B1 to Darren Moore describes a Pig which has a cylindrical central portion with an empty core with the two rounded ends and with pressure relief valves at the ends. This pig is formed of a flexible material and has a plurality of circumferential protuberances on the external surface with metal scrapers formed along the protuberances. The inside of the empty core is filled with a solution which is expelled through the pressure relief valves when the pressure inside the pig increases significantly.

Despite an improvement in cleaning efficiency, the abrasiveness of the above-mentioned outsides can cause severe scratches on the internal wall of the pipe, especially in the case of flexible lines which have a thin internal layer made of stainless steel.

The proposals addressing this increase in the scraping capability were developed by restricting the point of the bristles or the modification of the surface texture to only some narrow strips which are arranged helically, along the length of the pig on the outside of the pig's cylindrical body, so as to cover the whole inside diameter of the pipe.

Documents U.S. Pat. No. 4,720,884 to T. D. Williamson Inc and U.S. Pat. No. 5,384,929 present a support for the cleaning elements, specifically brushes, fitted on platforms made of elastic material. Document U.S. Pat. No. 6,538,431 to PII Limited shows a pig for pipe inspection with inspection elements fitted on platforms which withdraw or expand, following the inside diameter of the pipe in response to the deformation to which the impelling cups are subjected.

However, these pigs work on the concept of a one-way route of the pig inside the pipe.

There is a need for a pig to be developed which is capable of, for example, travelling inside a pipe bi-directionally and/or with scraping elements which were capable of providing efficient scraping in lines which have different diameters. Some proposals were made to this effect, as can be observed in, for example, document U.S. Pat. No. 6,145,150 to Kenneth M. Knapp in which a pig formed by two interconnected components, one of the components formed as a disc adapted in a cylindrical core, which has the possibility of passing right through a pipe with changes in diameter. The pig in question is made of foam. Even with these advances, the search has continued for equipment capable of:

travelling inside pipes which have quite different diameters, including intermediate diameters,
  passing through piggable "Y" connections,
  having a small pressure differential for movement,
  being capable of withstanding a change in direction without jamming due to the wedge effect or for any other reason,
  passing right through pipe bends,
  having great enough force of contact between the cleaning element and the internal wall of the pipe, and
  not damaging the inside of the pipe.

Document PI 0304793-8 of the Applicant presents a proposal for a multi-directional articulated scraping pig formed by 4 modules joined by a tensioning element, in which the two end modules are impelling modules and the two central modules are scraping modules, intended for removing incrustations on the walls of pipes.

However, the impelling modules have rigid cores with which there can be no longitudinal elongation when there is a change in diameter, which causes the destruction of the foam body of the impelling module.

This being the case, it has became necessary to develop impelling modules with which there could be longitudinal elongation, without the impelling module foam body's being destroyed in addition to retaining the other properties of the impelling modules of PI 0304793-8.

Therefore, exemplary embodiments of the multi-diameter elastic sealing module for pigs presented in this document might exceed the prior art due to having properties referenced above.

SUMMARY OF THE INVENTION

This invention relates to an item of equipment intended for being sent through the inside of a flexible or rigid pipe impelled by a fluid which flows inside the above-mentioned pipe, in order to move various fittings with the objective of removing internal incrustations of this pipe.

Exemplary embodiments of the equipment, known as Multi-diameter Elastic Sealing Module for Pigs, have a substantially cylindrical body made of polyurethane foam, with or without surface channels, with two distal ends each formed as a truncated cone, which gives it a symmetrical appearance. This symmetry eases bi-directional movement of the sealing module inside a pipe.

Each end of the sealing module has an element for clamping to towing modules or towed modules. These elements for clamping are joined to the elastic sealing module by means for fastening elements.

Inside the elastic sealing module body, a flexible core, which is a hollow cylindrical body, is inserted with ends formed such that coupling operations can be carried out and the elements for clamping are coupled. The flexible core has longitudinal slots, equally spaced in the cylindrical surface, which start close to a first end and terminate close to a second end of the flexible core and which form elastic strips integrated in this core.

The flexible core is made of elastomeric material and is inserted inside the sealing module with slight compression, which makes it possible for the sealing module to elongate longitudinally when there is a change in diameter of the pipe.

The sealing module of the exemplary embodiments of this invention has features seen immediately above and detailed below which make it a sealing module considered to be multi-diameter.

BRIEF DESCRIPTION OF THE DRAWINGS

The features of the multi-diameter elastic sealing module which is the subject of this invention, will be perceived better from the detailed description of exemplary embodiments which is given below, merely by way of example, associated with the drawings referenced below, which are an integral part of this specification.

FIG. 7 gives a perspective view of the exemplary embodiments of the first and second fastening element.

DETAILED DESCRIPTION

The detailed description of the multi-diameter elastic sealing module for pigs, which is the subject of this invention, shall be given in accordance with the identification of the components which constitute it.

This invention relates to a multi-diameter elastic sealing module for pigs, which is intended to be sent through the inside of a flexible or rigid pipe to move pigs with various fittings, with the objective of removing internal incrustations in the pipe. The elastic sealing module is impelled by a fluid which flows inside the above-mentioned pipe and is capable of being used as a complete pig or as a sealing/impelling module for multi-stage pigs, which moves fittings coupled to it.

Figure 1:
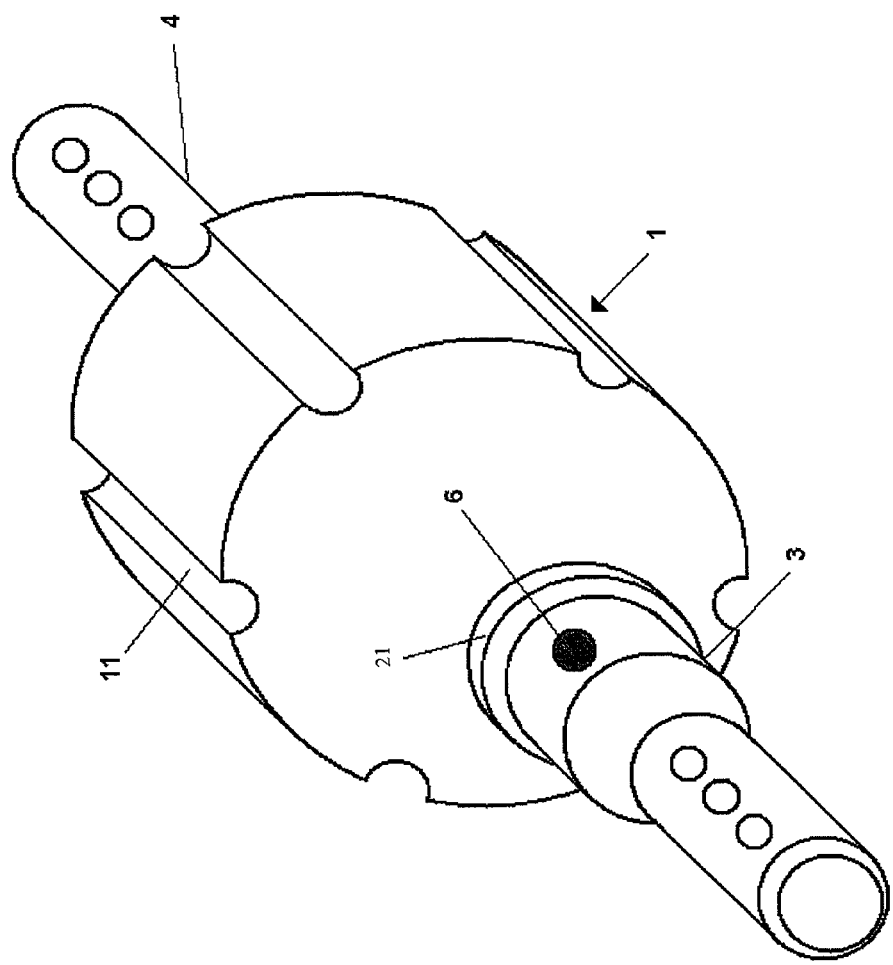
FIG. 1 gives a perspective view of a possible exemplary embodiment of the multi-diameter elastic sealing module according to this invention.

FIG. 1 gives a perspective view of a possible exemplary embodiment of the elastic sealing module which is the subject of this invention.

Figure 2:
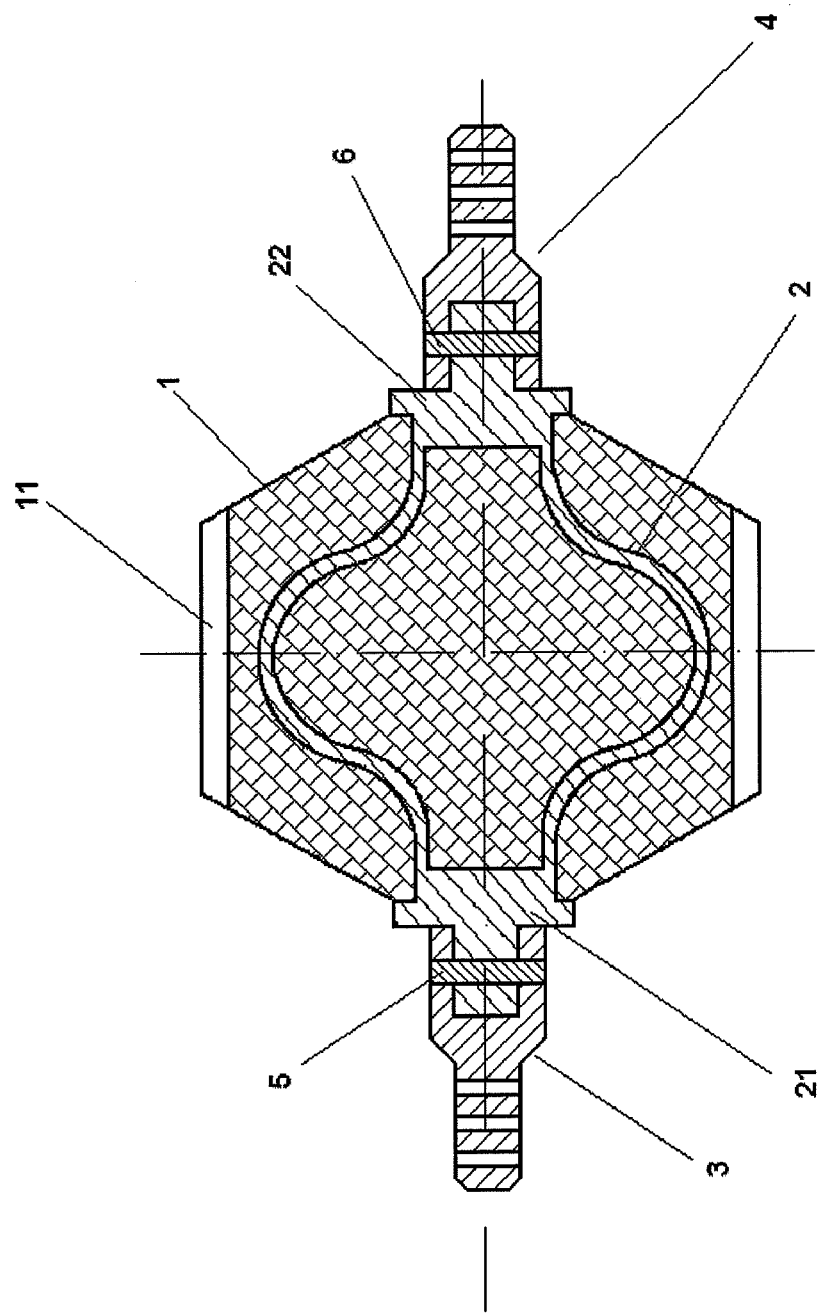
FIG. 2 gives a side view of the exemplary embodiment of the multi-diameter elastic sealing module shown in FIG. 1.

FIG. 2 gives a longitudinal section view of the exemplary embodiment, shown in FIG. 1, of the body of the elastic sealing module, which is the subject of this invention, which comprises:

a substantially cylindrical sealing/impelling element (1), with each of the ends terminating in the form of a truncated cone, a flexible core (2), which is a hollow cylindrical body, covered by the sealing/impelling element (1), with ends formed so that coupling operations can be carried out. The flexible core (2) has longitudinal slots (23), equally spaced in the cylindrical surface, which start close to a first end (21) of the flexible core (2) and which terminate close to a second end (22) of the flexible core (2) and which form elastic strips (24) integrated in the flexible core (2), a first, cylindrical, clamping element (3), with at least two segments with cross sections of different diameters, is coupled to the first end (21) of the flexible core (2), a second, cylindrical, clamping element (4), with at least two segments with cross sections of different diameters, is coupled to the second end (22) of the flexible core (2), a first fastening element (5) is joined to the first clamping element (3) and assists the fastening of the first clamping element (3) to the first end (21) of the flexible core (2), a second fastening element (6) is joined to the second clamping element (4) and assists the fastening of the second clamping element (4) to the second end (22) of the flexible core (2).

The sealing/impelling element (1) is impelled by the pumped fluid and moves the elastic sealing module through the inside of the pipe. The sealing/impelling element (1) maintains contact with the pipe walls alongside the area of the cylindrical surface, which reduces the risk of longitudinal misalignment of the elastic sealing module with respect to the pipe. The two ends of the sealing/impelling element (1), in the same configuration and in the form of a truncated cone, make it easier for the elastic sealing module to travel along the inside of the pipe bi-directionally.

The sealing/impelling element (1) may comprise longitudinal surface channels (11) which are equidistant and distributed on the cylindrical surface and is preferably made of polyurethane foam.

Figure 3:
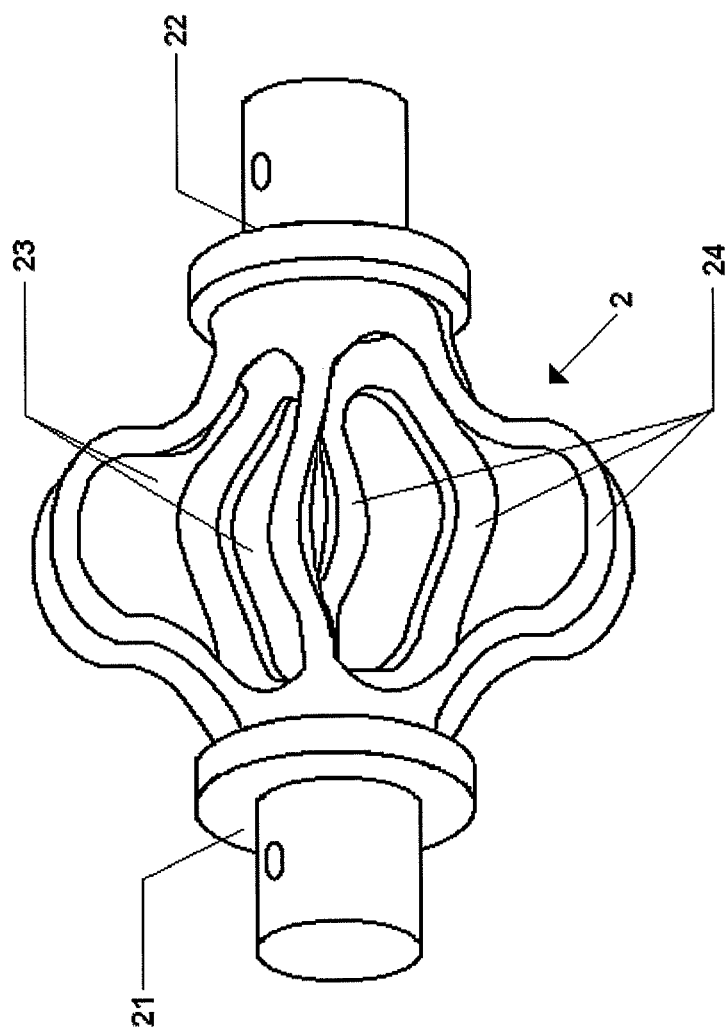
FIG. 3 gives a perspective view of the flexible core inserted in an exemplary embodiment of the multi-diameter elastic sealing module.
Figure 4:
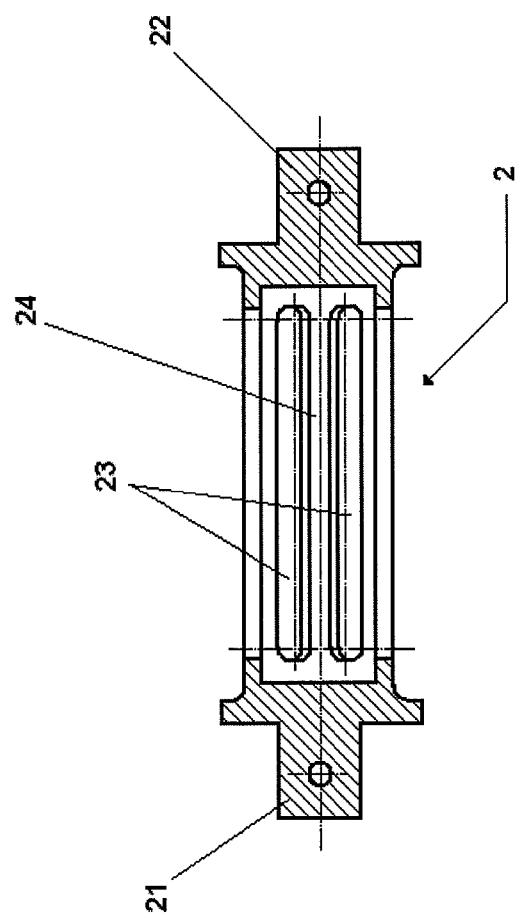
FIG. 4 gives a side view of the flexible core before it is inserted in the exemplary embodiment of the elastic sealing module.
Figure 5B:
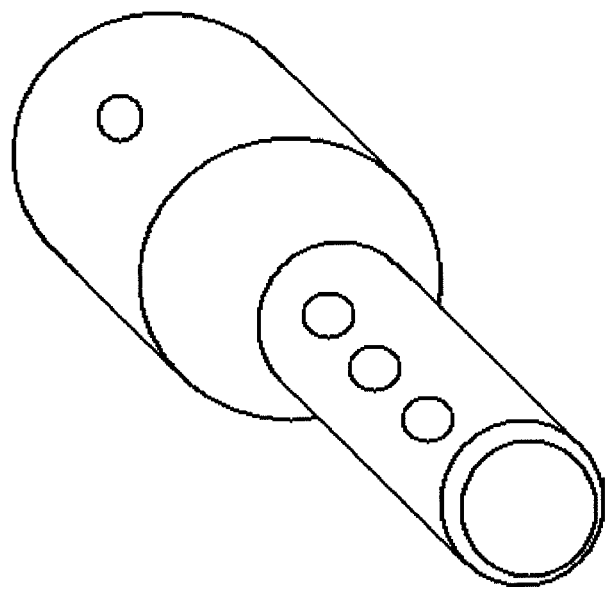
FIG. 5B gives a perspective view of a possible exemplary embodiment of the second clamping element.
Figure 5A:
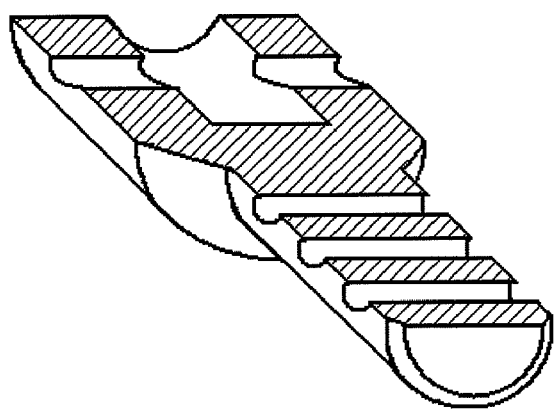
FIG. 5A gives a perspective view in section of a possible exemplary embodiment of the first clamping element.
Figure 6B:
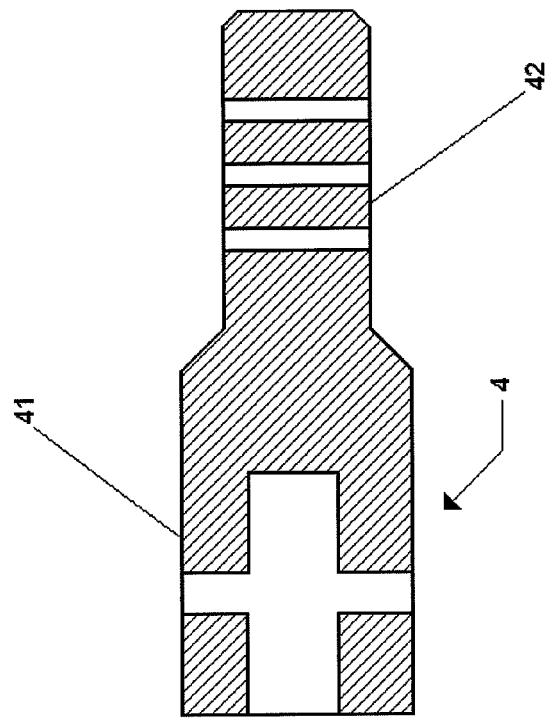
FIG. 6B gives a side view in section of the second clamping element of the first exemplary embodiment according to FIG. 5B.
Figure 6A:
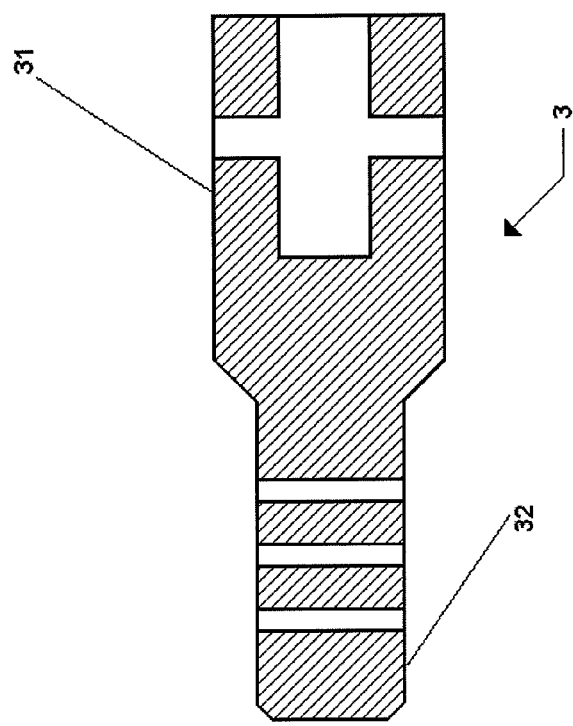
FIG. 6A gives a side view in section of the first clamping element of the first exemplary embodiment according to FIG. 5A.

FIG. 3 gives a perspective view of a possible exemplary embodiment of the flexible core (2) in the position in which it is inserted in the sealing/impelling element (1). The flexible core (2), when inserted in the sealing/impelling element (1), has a convexity in its most central area, with which it is possible for the sealing/impelling element (1) to elongate when there is a change in diameter of the pipe, for example, when the pipe diameter changes over from a greater diameter, such as 6", to a smaller diameter, such as 4".

The flexible core (2) is preferably made of elastomeric polyurethane.

The first end (21) of the flexible core (2) and the second end (22) of the flexible core (2) coincide with the ends of the sealing/impelling element (1), in addition to having configurations in which the clamping elements (3) and (4) can be coupled.

The first clamping element (3) and the second clamping element (4) assist the connection of the elastic sealing module to towed devices and/or to towing devices, which can accompany the elastic sealing module in its operation. Through the clamping elements (3) and (4), the elastic sealing module is capable of towing devices for scraping off incrustations on the pipe walls, devices for checking for structural defects in the pipe or such other devices as are necessary. Alternatively the clamping elements (3) and (4) make the elastic sealing module capable of being towed when it is an integral part of a multi-stage pig.

FIG. (5A) and FIG. (6A) show an embodiment of the first clamping element (3), which comprises at least two segments with different diameters as follows:

a first coupling segment (31), with configurations such that it can be coupled to the first end (21) of the flexible core (2).

a first clamping segment (32), with a configuration such that towed or towing devices can be clamped, said configuration possibly being, for example, a plurality of radial holes or an external screw thread.

FIG. (5B) and FIG. (6B) show an embodiment of the second clamping element (4), which comprises at least three segments with different diameters as follows:

a second coupling segment (41), with configurations such that it can be coupled to the second end (22) of the flexible core (2).

a second clamping segment (42), with a configuration such that towed or towing devices can be clamped, said configuration possibly being, for example, a plurality of radial holes or an external screw thread.

The first clamping element (3) and the second clamping element (4) are preferably made of metal.

The first fastening element (5) and the second fastening element (6) can be pins, nut and washer assemblies or other fastening means known from the prior art which are capable of keeping the clamping elements (3) and (4) joined to the flexible core.

The first fastening element (5) and the second fastening element (6) are preferably made of metal.

The elastic sealing module described above is also capable of:

operating in pipes formed by lengths of pipes, which may be flexible and be of variable diameters, moving in both directions of the pipe referenced above, making possible longitudinal elongation and better adaptation to the variations in pipe diameter.

passing through asymmetrical and converging piggable "Y" connections of at least 30°.

The description of the elastic sealing module given here, which is the subject of this invention, must be considered only a possible embodiment and any particular features must be understood as having been provided to assist understanding. In this way, they cannot be regarded as limiting the invention, which is limited only for the purpose of the following claims.

The invention claimed is:

1. A multi-diameter elastic sealing module for pigs which is sent through the inside of a flexible or rigid pipe to move various fittings and remove internal incrustations from said pipe, impelled by a fluid which flows inside the above-mentioned pipe, and which is used as at least one of a complete pig or a sealing/impelling module of a multi-stage pig, which moves fittings coupled to it, the multi-diameter elastic sealing module comprising:

a substantially cylindrical sealing/impelling element (1), the sealing/impelling element having a truncated cone formed at each end, a flexible core (2), formed as a hollow cylindrical body, which is covered by the sealing/impelling element (1), the flexible core having:

coupling means for carrying out coupling operations formed on at least one end of the flexible core longitudinal slots (23), formed equally spaced in the cylindrical surface of the flexible core, the longitudinal slots extending from near a first end (21) of the flexible core (2) and terminating near a second end (22) of the flexible core (2), wherein the longitudinal slots form elastic strips (24) in the flexible core (2), a first, cylindrical, clamping element (3) having at least two segments with cross sections of different diameters, the first clamping element being coupled to the first end (21) of the flexible core (2), a second, cylindrical, clamping element (4) having at least two segments with cross sections of different diameters, the second clamping element being coupled to the second end (22) of the flexible core (2), a first fastening element (5) joined to the first clamping element (3), which fastens the first clamping element (3) to the first end (21) of the flexible core (2), a second fastening element (6) joined to the second clamping element (4), which fastens the second clamping element (4) to the second end (22) of the flexible core (2).

2. The multi-diameter elastic sealing module for pigs according to claim 1, wherein the sealing/impelling element (1) comprises longitudinal surface channels (11) which are equidistant and distributed on the cylindrical surface.

3. The multi-diameter elastic sealing module for pigs according to claim 2, wherein the sealing/impelling element (1) is made of polyurethane foam.

4. The multi-diameter elastic sealing module for pigs according to claim 1, wherein the flexible core (2) has a convexity in its central most area, which allows the sealing/impelling element (1) to elongate longitudinally.

5. The multi-diameter elastic sealing module for pigs according to claim 4, wherein the flexible core (2) is made of elastomeric polyurethane.

6. The multi-diameter elastic sealing module for pigs according to claim 1, wherein the first end (21) of the flexible core (2) and the second end (22) of the flexible core (2) coincide with the ends of the sealing/impelling element (1).

7. The multi-diameter elastic sealing module for pigs according to claim 1, wherein the first end (21) of the flexible core (2) and the second end (22) of the flexible core (2) have configurations such that the first clamping element (3) and the second clamping element (4) can be coupled, respectively.

8. The multi-diameter elastic sealing module for pigs according to claim 1, wherein the first clamping element (3) comprises:

a first coupling segment (31), coupled to the first end (21) of the flexible core (2)

a first clamping segment (32) which clamps to at least one of devices to be towed by the multi-diameter elastic sealing module and devices to tow the multi-diameter elastic sealing module.

9. The multi-diameter elastic sealing module for pigs according to claim 8, wherein the first clamping element (3) and the second clamping element (4) are made of metal.

10. The multi-diameter elastic sealing module for pigs according to claim 1, wherein the second clamping element (4) comprises:

a second coupling segment (41) coupled to the second end (22) of the flexible core (2)

a second clamping segment (42) which clamps to at least one of devices to be towed by the multi-diameter elastic sealing module and devices to tow the multi-diameter elastic sealing module.

11. The multi-diameter elastic sealing module for pigs according to claim 10, wherein the first clamping element (3) and the second clamping element (4) are made of metal.

12. The multi-diameter elastic sealing module for pigs according to claim 1, wherein the first fastening element (5) is one of a pin or a nut and washer assembly.

13. The multi-diameter elastic sealing module for pigs according to claim 12, wherein the first fastening element (5) and the second fastening element (6) are made of metal.

14. The multi-diameter elastic sealing module for pigs according to claim 1, wherein the second fastening element (6) is one of a pin or a nut and washer assembly.

15. The multi-diameter elastic sealing module for pigs according to claim 14, wherein the first fastening element (5) and the second fastening element (6) are made of metal.

* * * * *